United States Patent
Bouvet et al.

(10) Patent No.: US 8,882,445 B2
(45) Date of Patent: Nov. 11, 2014

(54) HYDRAULIC MACHINE, AN ENERGY CONVERSION INSTALLATION INCLUDING SUCH A MACHINE, AND A METHOD OF ADJUSTING SUCH A MACHINE

(75) Inventors: Yves Bouvet, La Terrasse (FR); Jean-Francois Bertea, Saint Jean de Muzols (FR)

(73) Assignee: Alstom Renewable Technologies, Grenoble (FR)

(*) Notice: Subject to any disclaimer, the term of this patent is extended or adjusted under 35 U.S.C. 154(b) by 537 days.

(21) Appl. No.: 12/808,335

(22) PCT Filed: Dec. 24, 2008

(86) PCT No.: PCT/FR2008/052419
§ 371 (c)(1),
(2), (4) Date: Jun. 15, 2010

(87) PCT Pub. No.: WO2009/083697
PCT Pub. Date: Jul. 9, 2009

(65) Prior Publication Data
US 2010/0303615 A1    Dec. 2, 2010

(30) Foreign Application Priority Data
Dec. 28, 2007  (FR) ..................... 07 60441

(51) Int. Cl.
*F03B 3/02*  (2006.01)
*F03B 11/00*  (2006.01)

(52) U.S. Cl.
CPC .............. *F03B 3/02* (2013.01); *Y02E 10/226* (2013.01); *F05B 2240/53* (2013.01); *F03B 11/006* (2013.01); *Y02E 10/223* (2013.01)
USPC ..................... 415/110; 415/174.1

(58) Field of Classification Search
USPC ........... 415/1, 110–113, 172.1, 173.2, 173.3, 415/174.1–174.3; 416/174
See application file for complete search history.

(56) References Cited

U.S. PATENT DOCUMENTS

| | | | | |
|---|---|---|---|---|
| 3,516,757 A | * | 6/1970 | Baumann | 415/112 |
| 3,612,713 A | * | 10/1971 | Eggins et al. | 415/110 |
| 4,596,116 A | * | 6/1986 | Mandet et al. | 60/785 |
| 2005/0087933 A1 | | 4/2005 | Gittler | |

FOREIGN PATENT DOCUMENTS

| | | | |
|---|---|---|---|
| CH | 659856 | | 2/1987 |
| DE | 719267 | | 4/1942 |
| DE | 19611677 | | 8/1996 |
| GB | 1300148 | | 12/1972 |
| GB | 1300148 A | * | 12/1972 |
| JP | S5442543 A | | 4/1979 |
| JP | 5562869 | | 4/1980 |

(Continued)

*Primary Examiner* — Edward Look
*Assistant Examiner* — Juan G Flores
(74) *Attorney, Agent, or Firm* — Buchanan Ingersoll & Rooney PC

(57) ABSTRACT

A hydraulic machine including an impeller which rotates with respect to a fixed structure and about an axis of rotation by a forced flow of water passing through it and at least one device for limiting water leaks is positioned between the impeller and the fixed structure so as to define an operating clearance between the impeller and the fixed structure and including at least one member that can be deformed or moved, while the impeller is rotating and being fed with water, in a redial direction with respect to the axis of rotation of the impeller.

21 Claims, 14 Drawing Sheets

(56) References Cited

FOREIGN PATENT DOCUMENTS

| | | |
|---|---|---|
| JP | H01130064 A | 5/1989 |
| JP | 674141 | 3/1994 |
| JP | 9209902 | 8/1997 |
| JP | 9327198 | 12/1997 |

* cited by examiner

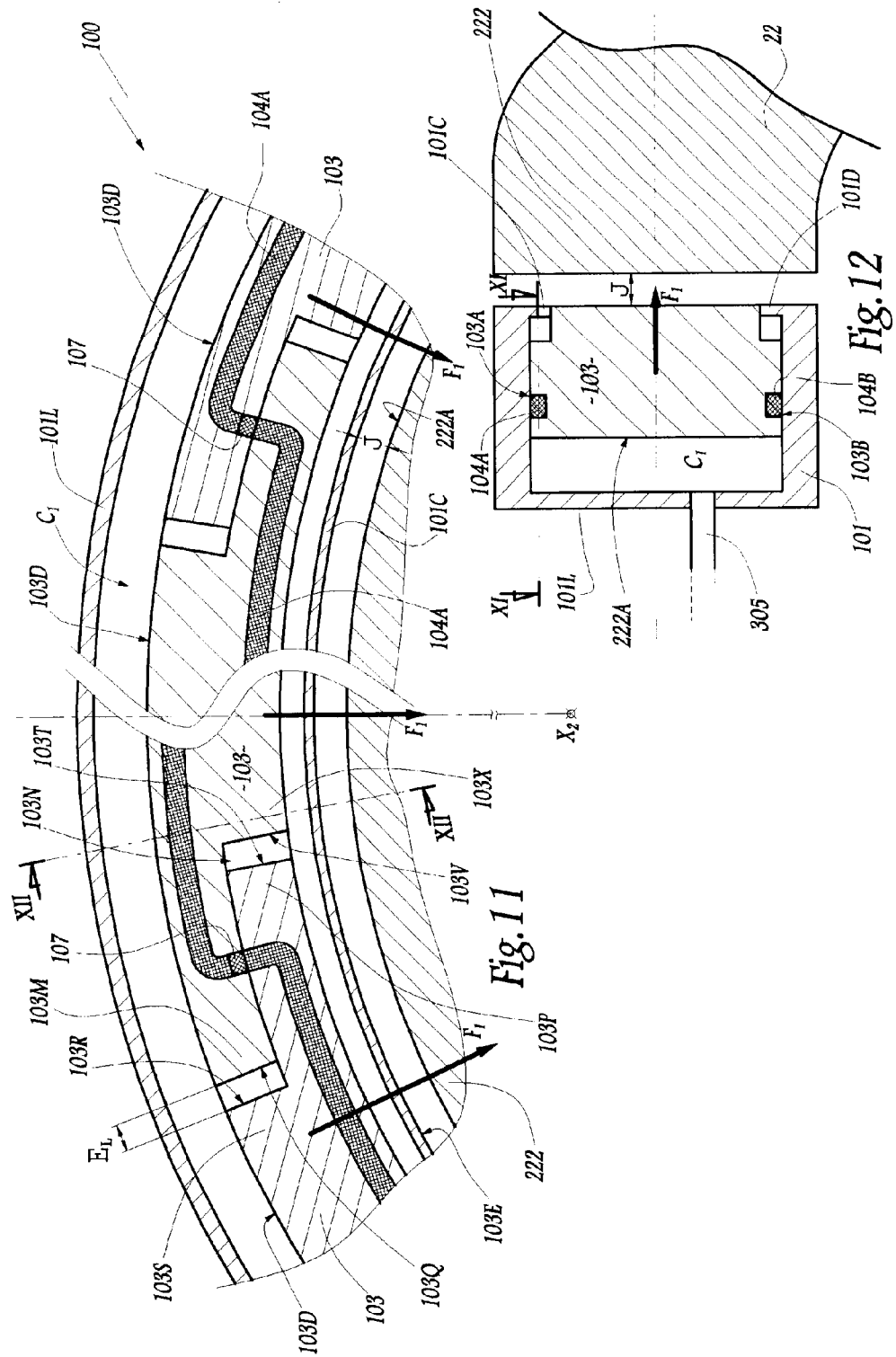

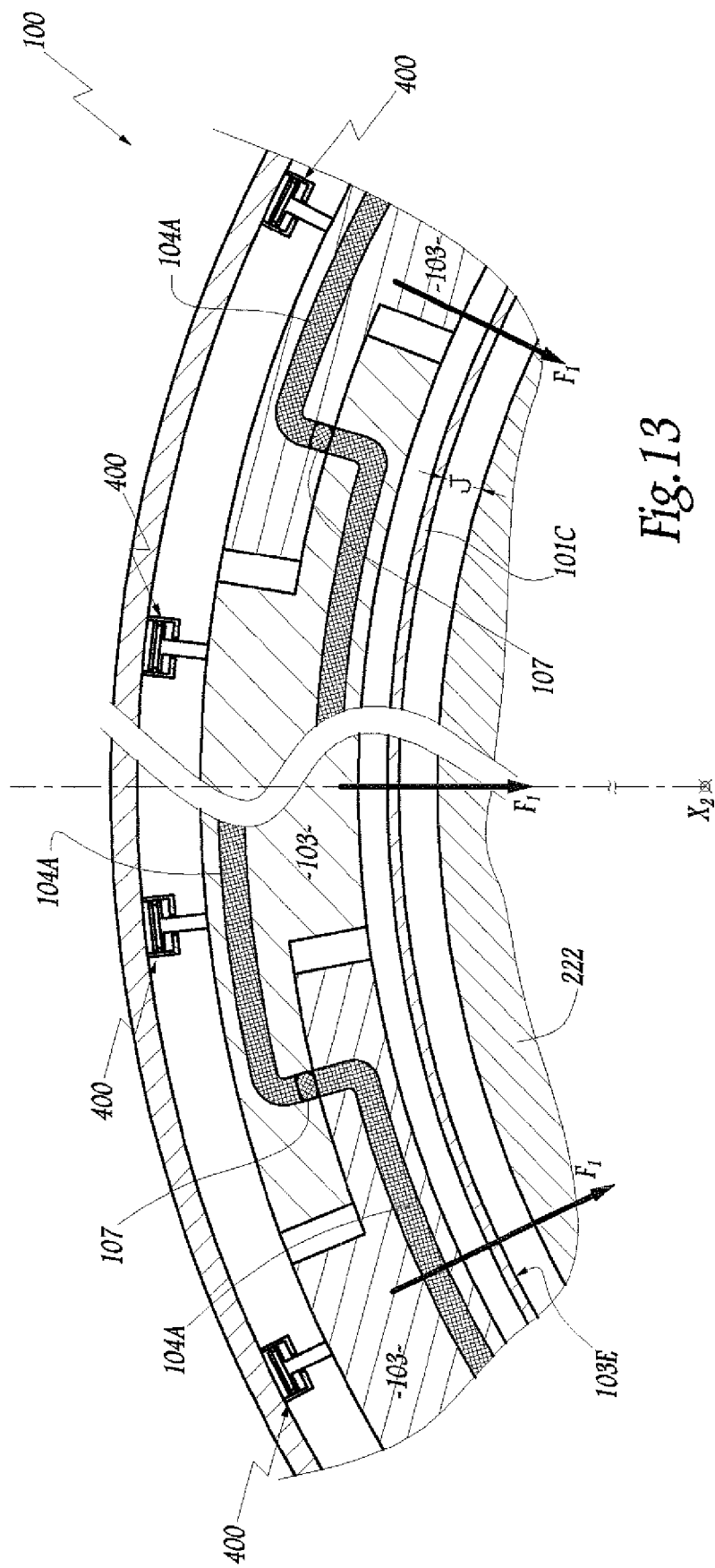

HYDRAULIC MACHINE, AN ENERGY CONVERSION INSTALLATION INCLUDING SUCH A MACHINE, AND A METHOD OF ADJUSTING SUCH A MACHINE

BACKGROUND OF THE INVENTION

1. Field of the Invention

The present invention relates to a hydraulic machine that has a wheel mounted to move in rotation relative to a stationary structure and about a stationary axis, said wheel being designed to pass a forced flow of water therethrough. Such a forced flow causes the wheel to be driven in rotation when the machine is a turbine. Such a flow results from said rotation when the machine is a pump.

2. Brief Description of the Related Art

Regardless of whether it is a turbine, a pump, or a pump turbine, a hydraulic machine is generally equipped with a device that is more often known as a "labyrinth" and that is designed to limit water leaks that result from the fact that a quantity of the water brought to the vicinity of a wheel tends to leak around said wheel. Such leaks give rise to loss of efficiency of the installation to which the machine belongs, and said labyrinth aims to limit that by defining operating clearances that are relatively narrow between the wheel and a stationary structure of the machine so that the flow path of the leaks is relatively narrow, thereby limiting the leakage flow-rate.

Labyrinths are generally designed in the form of a cylinder concentric with the axis of rotation of the wheel, with one or more stages imparting clearance that is as small as possible. In order to avoid premature wear of the labyrinth while the wheel is rotating, the operating clearance must be sufficient to take account of any radial movements of the wheel at transient speeds and to take account of any expansion of the wheel under the effect of the centrifugal force. In such a situation, the operating clearance of a current labyrinth must be determined by taking account of the most unfavorable operating conditions, namely transient speeds, and by taking account of the radial movements of the wheel. That leads to operating clearances being defined that are relatively large, and hence to non-negligible leakage around the wheel, in particular when the machine is a Francis turbine.

Analogous problems arise with pumps and with turbine pumps.

SUMMARY OF THE INVENTION

More particularly, an object of the invention is to remedy those drawbacks by proposing a hydraulic machine in which the operating clearance of the leak limiter device can be optimized in order to reduce the leakage flow-rate.

To this end, the invention provides a hydraulic machine having a wheel mounted to move in rotation relative to a stationary structure and about a stationary axis, the wheel being designed to pass a forced flow of water therethrough, while at least one leak limiter device for limiting water leaks is disposed between the wheel and the stationary structure, said device defining an operating clearance between the wheel and the stationary structure. The leak limiter device has at least one deformable and/or movable member that is deformable and/or movable in a radial direction relative to the axis of rotation, while the wheel is rotating. This machine is characterized in that the deformable and/or movable member is deformable and/or mobile in the radial direction, between a first configuration corresponding to a first value of the operating clearance and a second configuration corresponding to a second value of the operating clearance and in that the machine includes means to control switching of the deformable and/or movable member from its first configuration to its second configuration depending on the operating speed of the machine.

By means of the deformable and/or movable member, it is possible to adjust the operating clearance of the leak limiter device that is more often known as a "labyrinth" even while the machine is being used, i.e. even while its wheel is rotating. This makes it possible to take account of the various operating clearance needs corresponding to the various possible operating speeds of the machine. In particular, it is possible to adopt maximum clearance during periods of use of the machine during which the wheel might move radially to a relatively large extent or might expand due to centrifugal forces. This applies, in particular, to start-up periods and to periods of excessive speed. Conversely, while the machine is in a generating period, e.g. while a turbine is coupled to an alternator in stabilized conditions, minimum clearance can be adopted insofar as the rotation of the wheel is also stabilized. This minimum clearance makes it possible to reduce the leakage of water around the wheel and thus to increase the efficiency of the machine. In addition, the movable nature of the member of the device of the invention makes it possible to consider moving it after an impact has been suffered by the wheel while said wheel is moving transversely relative to its axis of rotation.

In advantageous but non-essential aspects of the invention, such a machine may incorporate one or more of the following characteristics, taken in any technically feasible combination:

The leak limiter device has a deformable member that is deformable under the effect of the pressure exerted by a control fluid, between a first configuration corresponding to a first value for the operating clearance and a second configuration corresponding to a second value for the operating clearance. The deformable member is advantageously suitable for deforming by contracting radially to go from its first to its second configuration. This deformable member surrounds the wheel over the entire circumference thereof.

The leak limiter device has a plurality of movable members that are mounted to move radially relative to the axis of rotation of the wheel, between a first configuration corresponding to a first value for the operating clearance and a second configuration corresponding to a second value for the operating clearance.

The member or the members is or are mounted on the stationary structure with its/their radially inside surface(s) facing towards a radially outside surface of the wheel, while the operating clearance is defined between said radially inside and outside surfaces.

The machine has means for centering the member(s) relative to the axis of rotation of the wheel in each of the first and second configurations.

The member or each member co-operates with a portion of the stationary structure to define a chamber of variable volume that varies as a function of the configuration taken up by the member(s), this chamber being fed with control fluid under pressure. In this case, it is possible to provide means for controlling feeding the chamber of variable volume with control fluid under pressure.

In a variant, the machine has actuators for controlling movement of the movable members between the two configurations that they can take up.

In another variant, the machine has at least one means exerting a resilient return force on the movable members for urging them back into one of the two configurations that they can take up.

The machine has means for holding the or each member stationary in rotation about the axis of rotation of the wheel.

The control fluid is water tapped from a feed duct for feeding the wheel with water for forming the forced flow. In a variant, the control fluid may be a gas, in particular air, or oil.

The invention further provides an installation for converting hydraulic energy into electrical energy, or vice versa, said installation including a machine as mentioned above. Such an installation has better efficiency than state-of-the-art machines.

Finally, the invention further provides an adjustment method that can be implemented with a machine as described above, with a view to optimizing the operating clearance of a leak limiter device. According to this method, the adjustment takes place while the wheel is rotating about its axis by adopting a first value for the operating clearance during certain periods of rotation of the wheel, including at least transient speeds, and a second value for the operating clearance during certain other periods of rotation of the wheel, including at least one stabilized speed.

Advantageously, one of the values for the operating clearance is adopted by controlling the pressure and/or the quantity of a control fluid delivered to the leak limiter device.

BRIEF DESCRIPTION OF THE DRAWINGS

The invention can be better understood and other advantages of the invention appear more clearly from the following description of six embodiments of a machine and of an installation that comply with the principle of the invention, the description being given merely by way of example and with reference to the accompanying drawings, in which:

FIG. 11 is a fragmentary axial section view showing the principle of a Francis turbine in a third embodiment of the invention;

FIG. 12 is a fragmentary section view on line XII-XII in FIG. 11;

FIG. 13 is a section view analogous to FIG. 11 for a turbine in a fourth embodiment of the invention;

DESCRIPTION OF THE PREFERRED EMBODIMENTS

Figure 1:
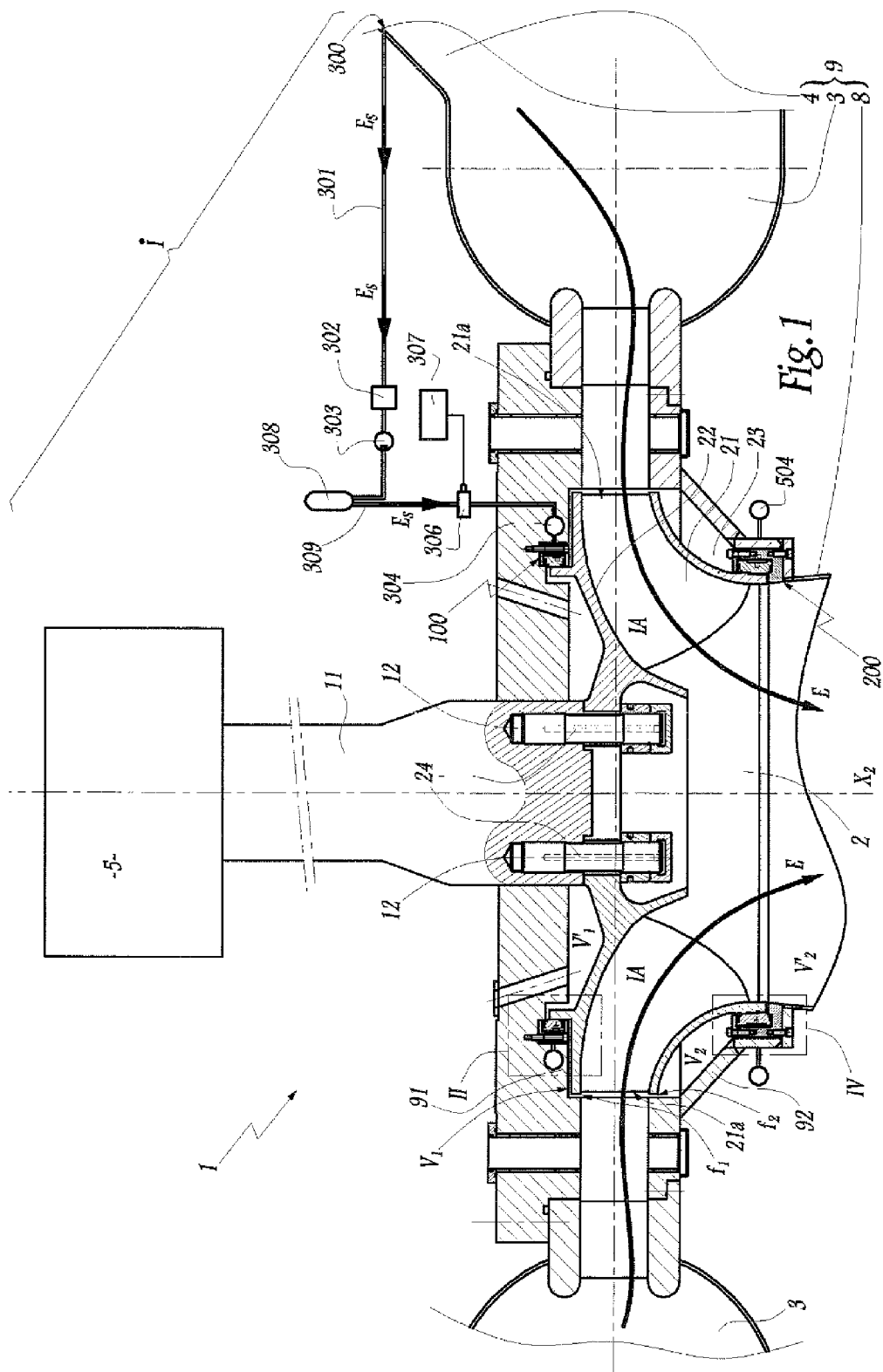
FIG. 1 is a section view showing the principle of a high-head energy conversion installation of the invention that includes a Francis turbine of the invention in a first operating configuration.

The installation I shown in FIGS. 1 to 5 includes a Francis turbine 1 whose wheel or "runner" 2 is fed from a casing 3 into which a forced-flow duct 4 opens out. The vertical axis of rotation of the wheel 2 is stationary and is referenced $X_2$. The turbine 1 is coupled via a shaft 11 to an alternator 5. Between the casing 3 and the wheel 2 there are disposed two series of stay vane blades and of wicket gates (not shown) whose function is to guide a flow E that is coming from the duct 4 and that is to pass through the wheel 2 towards a discharge conduit 8.

The wheel 2 is provided with blades 21 that extend between a ceiling 22 and a belt 23. The blades co-operate with one another and with the ceiling 22 and the belt 23 to define inter-blade spaces IA through which the flow E passes while it is flowing through the wheel 2.

The wheel 2 is fastened to the bottom portion of the shaft 11 by means of screws 24 tightened into tapped holes 12 provided in the shaft 11.

The casing 3, the duct 4, and the conduit 8 are part of a stationary structure 9 that is shown in fragmentary manner only in the figures, and that supports the rotary portions of the turbine 1, in particular the shaft 11 and the wheel 2.

When it reaches the vicinities of the leading edges 21a of the blades 21, the flow 21 can enter the inter-blade spaces IA. It can also penetrate, through an annular slot $f_1$, into an annular volume $V_1$ defined between the ceiling 22 and a portion 91 of the stationary structure 9. The flow E can also penetrate through an annular slot $f_2$ into an annular volume $V_2$ defined between the belt 23 and another portion 92 of the stationary structure 9.

The unwanted flows of water into the volumes $V_1$ and $V_2$ are indicated by arrows $E_1$ and $E_2$ in FIGS. 2 to 5. To avoid said unwanted flows $E_1$ and $E_2$ giving rise to large leaks and to a significant reduction in the efficiency of the turbine 1, leak limiter devices 100 and 200 are interposed between the wheel 2 and the portions 91 and 92.

The device 100 aims to limit the leaks from the volume $V_1$ to a volume $V'_1$ situated above the ceiling 22, radially between the volume $V_1$ and the axis $X_2$. The device 200 aims to limit the leaks from the volume $V_2$ to the internal volume $V'_2$ of the conduit 8. The unwanted flows $E_1$ and $E_2$ thus flow from the inlet zone of the wheel 2 to the vicinities of the leading edges 21a, respectively through the slots $f_1$ and $f_2$ and the volumes $V_1$ and $V_2$ towards the volumes $V'_1$ and $V'_2$.

The device 100 has a housing 101 made up of two half-shells 101A and 101B. The housing 101 is held stationary on the portion 91 by means of screws 102 that pass through the two half-shells 101A and 101B and that are tightened into tapped holes 91A provided in the portion 91. The half-shells 101A and 101B are circular and centered on the axis $X_2$. A sufficient number of screws 102 are provided to enable the housing 101 to be fastened effectively to the stationary portion 91.

A ring 103 is mounted in the housing 101 and it co-operates with the housing to define a chamber of variable volume $C_1$ that is isolated from the outside by two seals 104A and 104B that are mounted in grooves 103A and 103E provided in respective ones of the top and bottom faces of the ring 103.

Studs 105 are engaged in recesses 101F and 103F provided respectively in the housing 101 and in the ring 103 in such a manner as to hold the ring 103 stationary relative to the housing 101, in rotation about the axis $X_2$.

The half-shell 101A has a wall 101C that faces towards the half-shell 101B. Similarly, the half-shell 101E has a wall 101D that faces towards the half-shell 101A, and more particularly towards the wall 101C. An opening $O_1$ is defined between the walls 101C and 101D, and the ring 103 is provided with a nose 103C that is disposed between the walls 101C and 101D.

The ring 103 is made of an elastically deformable material, e.g. of steel or of a composite material. Said ring may be contracted towards the axis $X_2$, in the direction indicated by arrow $F_1$ in FIGS. 2 and 3, under the effect of a force exerted on its radially outside surface 103D. The contraction of the ring 103 towards the axis $X_2$ is controlled by injecting water under pressure into the chamber $C_1$.

This water comes from the forced-flow duct 4 from which it is tapped by means of a tap-off 300 that constitutes the mouth of a pipe 301 making it possible to convey a secondary flow $E_s$ towards a filter 302, and then towards a pump 303 that makes it possible to increase the pressure of the flow $E_s$. This pump feeds an accumulator tank 308 connected via a pipe 309 to a torus-shaped duct 304 connected to the chamber $C_1$ via tap-offs 305 opening out into the housing 101. Said tap-offs 305 are distributed about the axis $X_2$ in planes offset angularly relative to the zones for receiving the screws 102.

In addition, the ceiling 22 of the wheel 2 is equipped with a circular fin 221 that is formed integrally with the ceiling and that extends upwards relative to the top surface thereof. In a variant, the fin 221 can be removable.

When the turbine 1 is in the assembled configuration, the fin 221 has its radially outside surface 221A disposed facing the device 100. More precisely, the surface 221A is disposed facing a portion of the radially inside surface 103E of the ring 103, which surface is actually the surface of the nose 103C that is accessible through the opening $O_1$.

While the turbine 1 is operating, the fin 221 turns about the axis $X_2$ with the wheel 2, whereas the device 100 is stationary because it is mounted on the portion 91. Operating clearance J must therefore be defined between the fin 221 and the facing portions of the device 100, namely the half-shell 101B and the ring 103.

Figure 2:
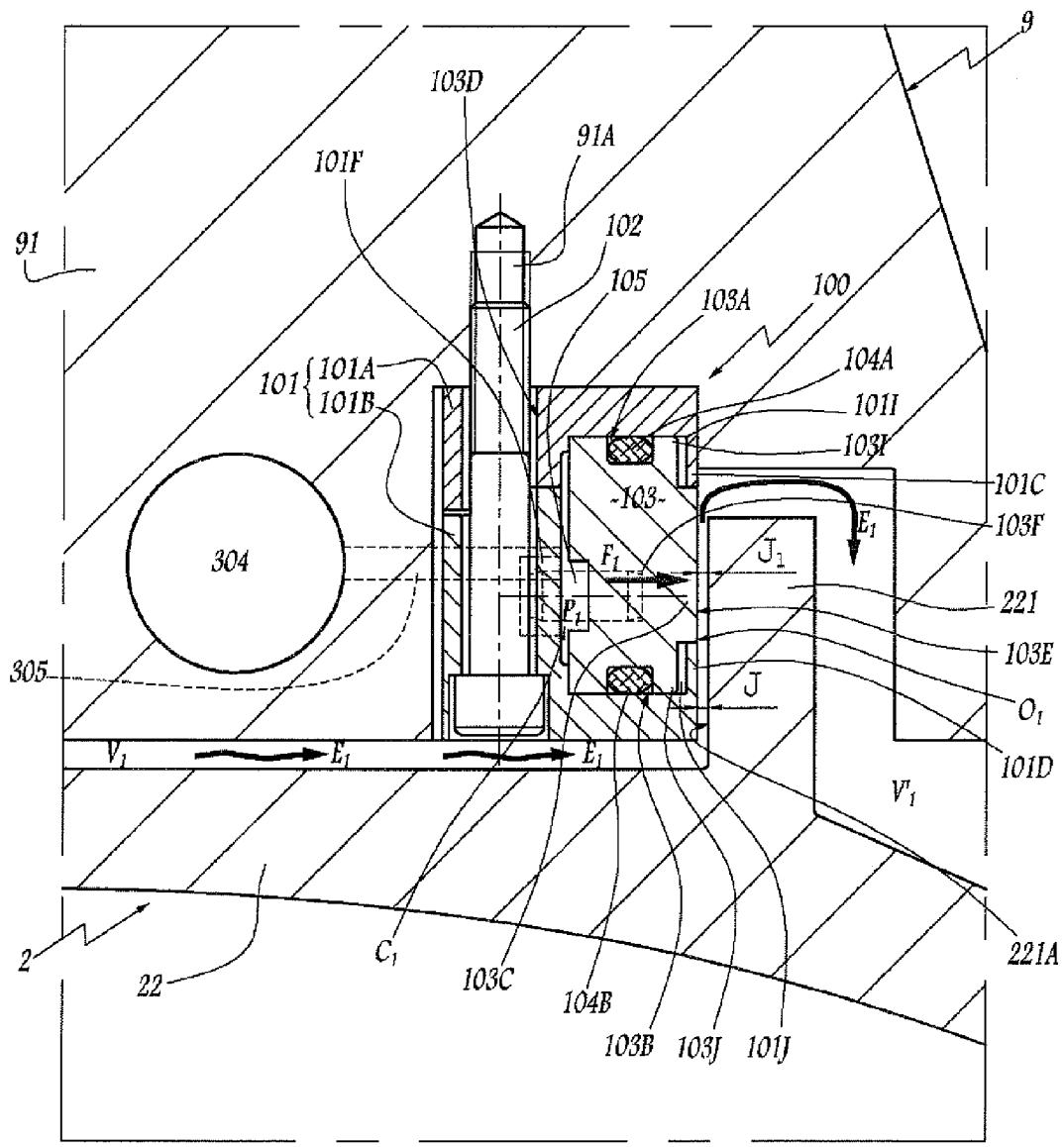
FIG. 2 is a view on a larger scale of the detail II of FIG. 1.

Because of this operating clearance J, the flow $E_1$ that penetrates into the volume $V_1$ can propagate towards the volume $V'_1$, as indicated by the arrows $E_1$ in FIG. 2.

In the configuration of FIG. 2, the chamber $C_1$ is not fed with water under pressure from the duct 304, and the pressure $P_1$ of the water in the chamber $C_1$ is low, or indeed zero, so that, because of its resilience, the ring 103 takes up a relatively unstressed configuration in which the surface 103E does not project from the walls 101C and 101D. The clearance $J_1$ between the surfaces 103E and 221A is thus sufficiently large to avoid impacts between the fin 221 and the device 100, or to limit the contact forces, even when the wheel 2 is misaligned on the axis $X_2$ or when the wheel 2 expands under the effect of the centrifugal force.

Once the turbine 1 has reached a stabilized operating speed, the risks of the wheel 2 becoming misaligned relative to the axis $X_2$ are minimized, and the clearance J can be reduced to a value $J_2$ that is less than the value $J_1$, while causing the nose 103C to project from the housing 101 towards the fin 221. This is obtained by increasing the pressure of water in the chamber $C_1$ to a value $P_2$ that results from the chamber $C_1$ being put into communication with the accumulator tank 308 through the duct 304 and through the tap-offs 305. The pressure $P_2$ exerts a distributed force on the surface 103D of the ring 103, as indicated by the arrows $F_2$ in FIG. 3, which force causes the ring 103 to contract radially towards the axis $X_2$, so that the surface 103E moves towards the surface 221A, while reducing the through cross section that is possible for the flow $E_1$. Water leaks, from the volume $V_1$ to the volume $V'_1$ are thus limited.

A solenoid valve 306, mounted on the duct 301 between the pump 303 and the duct 304, makes it possible to control putting the accumulator tank 308 and the chamber $C_1$ into communication with each other. This solenoid valve is controlled by an electronic control unit 307. In a variant, solenoid valves can be installed on the tap-offs 305, between the duct 304 and the chamber $C_1$, for controlling feeding pressurized water to the chamber.

In addition, a solenoid valve (not shown) makes it possible to put the chamber $C_1$ into communication with an emptying line (not shown) that drains into the conduit 8 or into a drainage well (not shown).

In the event that turbine 1 is subjected to a sudden transient speed, in particular in the event of excessive speed, it is possible, by closing the solenoid valve 306 and by opening the other solenoid valve, to empty the chamber $C_1$ rapidly, so that the ring 103 returns resiliently to its FIG. 2 configuration that makes it possible to limit the risks of accidental contact between the ring 103 and the fin 221.

Figure 3:
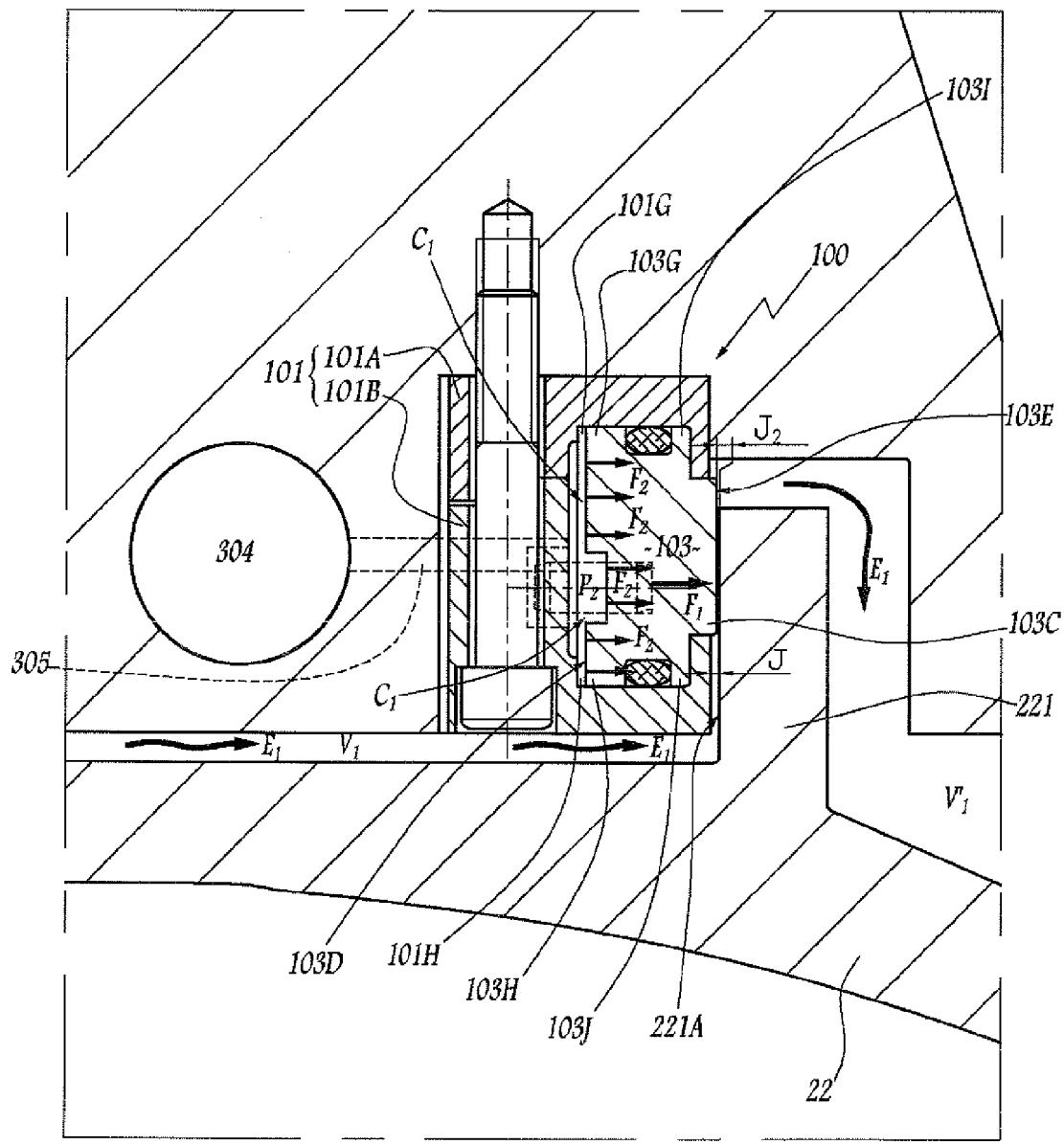
FIG. 3 is a view analogous to FIG. 2 when the turbine is in a second operating configuration.

In the section plane of FIGS. 2 and 3, the housing 101 defines four reentrant corners 101G, 101H, 101I and 101J that are substantially complementary to respective ones of four salient corners 103G, 103H, 103I, and 103J of the cross-section of the ring 103 that can be seen in FIGS. 2 and 3.

The corners 101G, 101H, 103G, and 103H constitute centering means that act by means of co-operating shapes to center the ring 103 relative to the axis $X_2$ in the FIG. 2 configuration. In the same way, the corners 101I, 101J, 103I, and 103J constitute centering means that act by means of co-operating shapes to center the ring 103 in the FIG. 3 configuration.

By acting on the feed pressure of the chamber $C_1$ from the duct 304 and on the open time of the solenoid valve 306, it is possible to cause the ring 103 to take up an intermediate configuration between the configurations shown respectively in FIGS. 2 and 3, which can be suitable for certain operating speeds of the turbine 1.

The component elements of the device 200 that are analogous to the component elements of the device 100 bear like numerical references plus 100. The device 200 has a housing 201 made up of two half-shells 201A and 201B mounted on the portion 92 and assembled together by means of screws 202. An elastically deformable ring 203 is disposed in the housing 201 while being subjected to the pressure prevailing in a chamber $C_2$ of variable volume defined by the housing 201 and by the ring 203.

Two O-ring seals 204A and 204B are disposed in respective ones of grooves 203A and 203B provided respectively in the top side and in the bottom side of the ring 203.

Studs 205 are provided for indexing the ring 203 relative to the housing 201 in rotation about the axis $X_2$.

Figure 4:
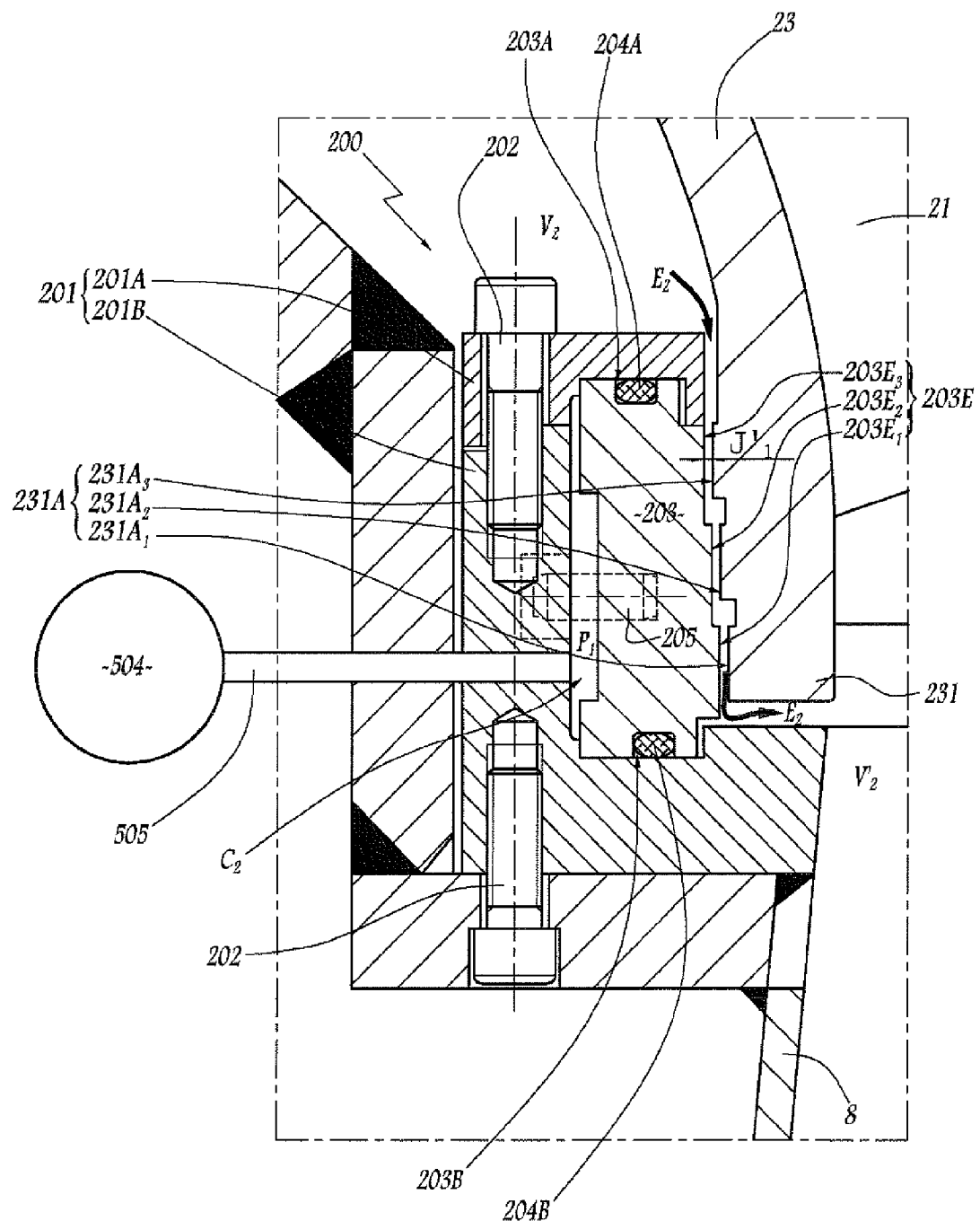
FIG. 4 is a view on a larger scale of the detail IV of FIG. 1.
Figure 5:
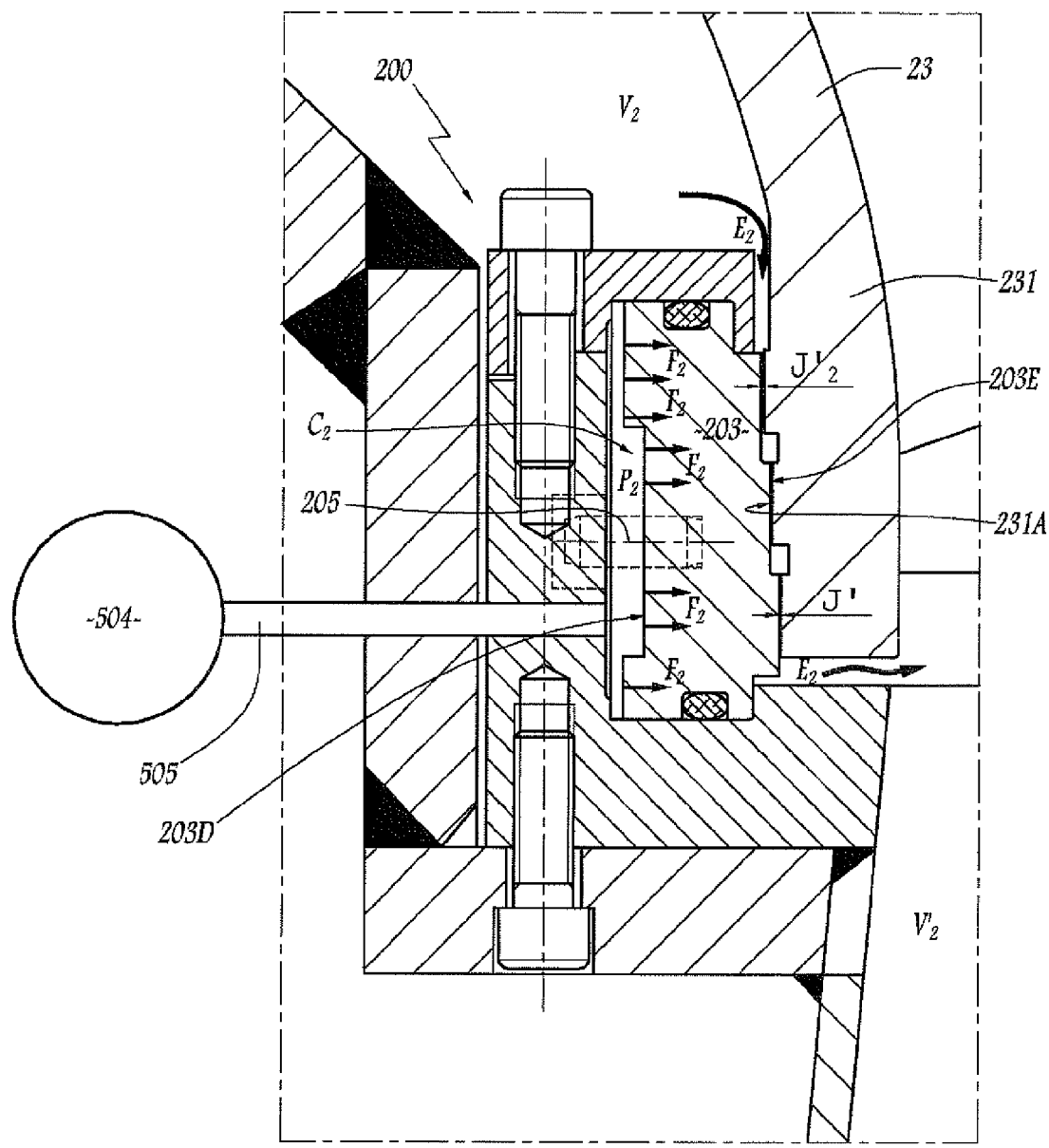
FIG. 5 is a view analogous to FIG. 4 when the machine is in a second operating configuration.
Figure 6:
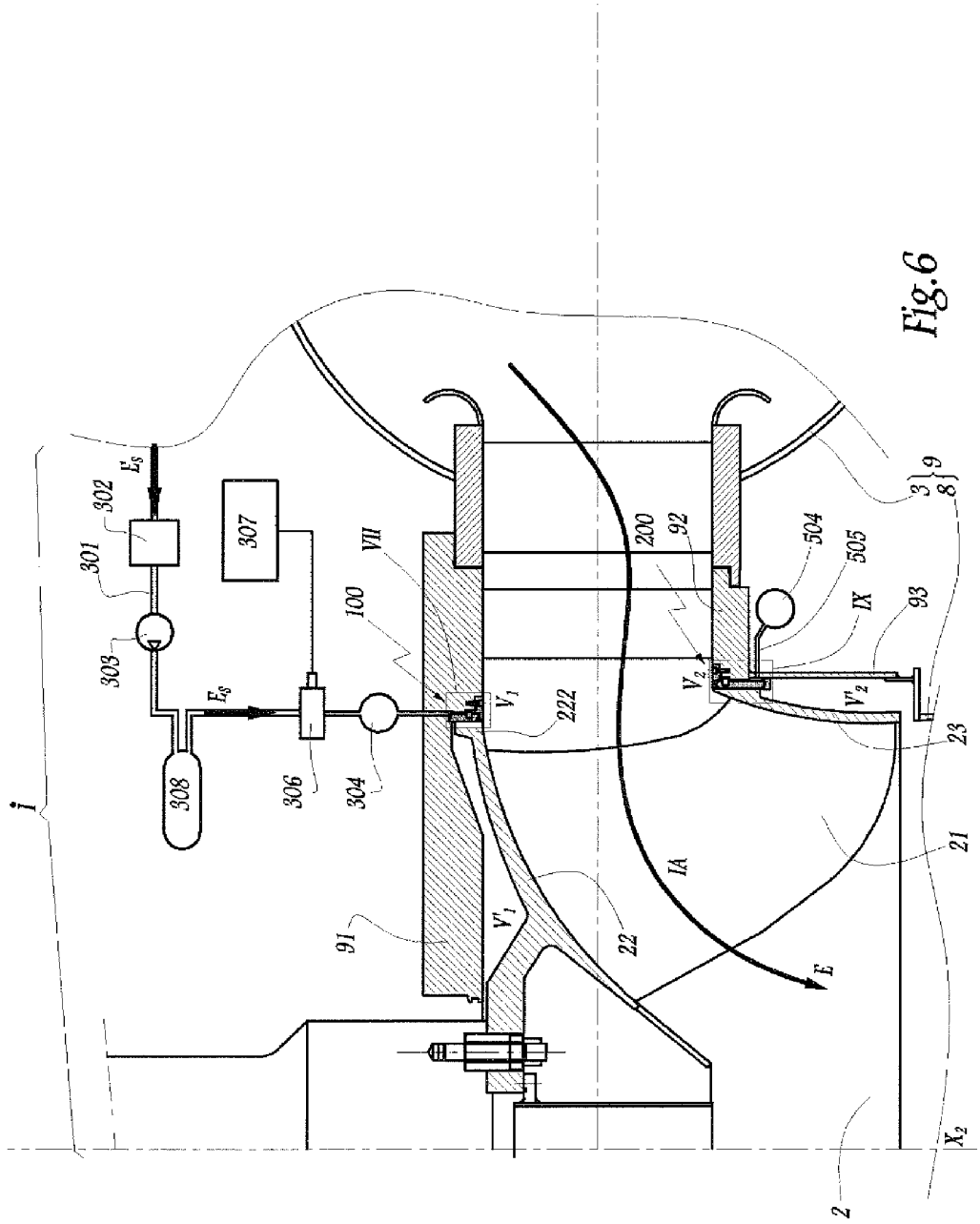
FIG. 6 is a view analogous to a portion of the right half of FIG. 1, for a low-head installation and a Francis turbine in a second embodiment of the invention.

As above, reentrant corners defined by the housing 201 and salient corners defined by the ring 203 in the plane of FIGS. 4 and 5 make it possible to center said ring relative to the axis $X_2$ in the two configurations shown respectively in these figures.

The radially inside surface 203E of the ring 203 is stepped in that it comprises three portions $203B_1$, $203E_2$ and $203E_3$, each of which is formed by a cylindrical surface having a circular base, the diameter of the portion $203E_2$ being larger than the diameter of the portion $203E_1$, and smaller than the diameter of the portion $203E_3$.

Correspondingly, the radially inside surface 231A of the downstream edge 231 of the belt 23 is made up of three portions $231A_1$, $231A_2$, and $231A_3$ of increasing diameters.

The surfaces 203E and 231E define between them a sinuous passage through which a leakage flow-rate can flow, as indicated by the arrows $E_2$ in FIG. 4. As above, the operating clearance J' of the turbine 1 at the belt 23 is defined as being the minimum distance between the surfaces 203E and 231A.

In the configurations in which the clearance J' must be at a maximum, in particular in the event of transient speeds as mentioned above with regard to the device 100, the clearance J' is maintained at a maximum value $J'_1$ corresponding to the configuration of FIG. 4, insofar as the water pressure in the chamber $C_2$ is maintained at a value $P_1$ that is low or zero.

Said chamber $C_2$ is fed with water under pressure by means (not shown) that are entirely comparable to the means used for feeding the chamber $C_1$, and that comprise a duct 504 connected to the chamber $C_2$ via tap-offs 505. The duct 504 may be connected to the pump 303 or to any other source of water under pressure. The water feed via the duct is controlled, e.g. by means of a solenoid valve analogous to the solenoid valve 306, or indeed by the same solenoid valve 306 if it is chosen to cause the pressures in the chambers $C_1$ and $C_2$ to vary simultaneously.

While the turbine 1 is being used a steady speed, the clearance J' may be reduced to a value $J'_2$ shown in FIG. 5. For this purpose, the pressure of the water in the chamber $C_2$ is brought to a value $P_2$ that is greater than the value $P_1$. The effect of this is to bring the surface 203E closer to the surface 231A, thereby limiting the through section area for the flow $E_2$ from the volume $V_2$ to the volume $V'_2$. In FIG. 5 the arrows $F_2$ indicate the radial compression force of the ring 203 towards the axis $X_2$, which force is due to the pressure $P_2$ of the water in the chamber $C_2$ and is exerted on the radially outside surface 203D of the ring 203.

The turbine shown in FIGS. 1 to 5 is a high-head turbine for which the locations of the devices 100 and 200 have been optimized.

The invention is also applicable to low-head turbines, as shown in FIGS. 6 to 10 for the second embodiment, in which elements analogous to the elements of the first embodiment bear like references.

In this embodiment, a leak limiter device 100 is mounted on a plate 91 belonging to the stationary structure 9 of the installation I, so as to generate operating clearance with the radially outside edge 222 of the ceiling 22 of the wheel 2. The device 100 has a plate 101 that is held stationary on the portion 91 by means of a screw 102. A recess is also provided in the plate 91, in the vicinity of the edge 222 for the purpose of receiving an elastically deformable ring 103 whose top and bottom edges are provided with respective seals 104A and 104B engaged in grooves 103A and 103B provided for this purpose.

A seal 106 provides sealing for the assembly between the plate 101 and the portion 91.

Figure 7:
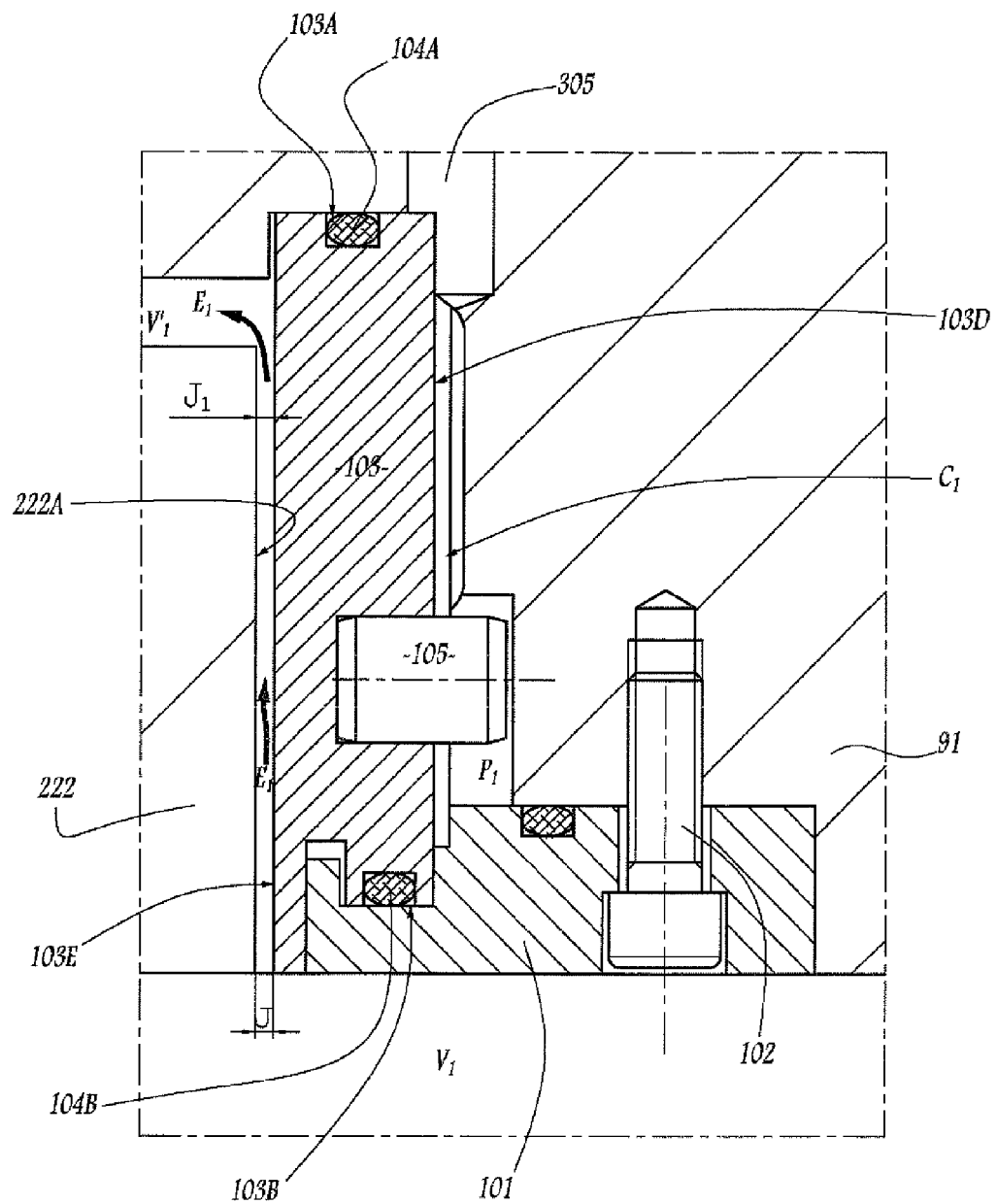
FIG. 7 is a view on a larger scale of the detail VII of FIG. 6.
Figure 8:
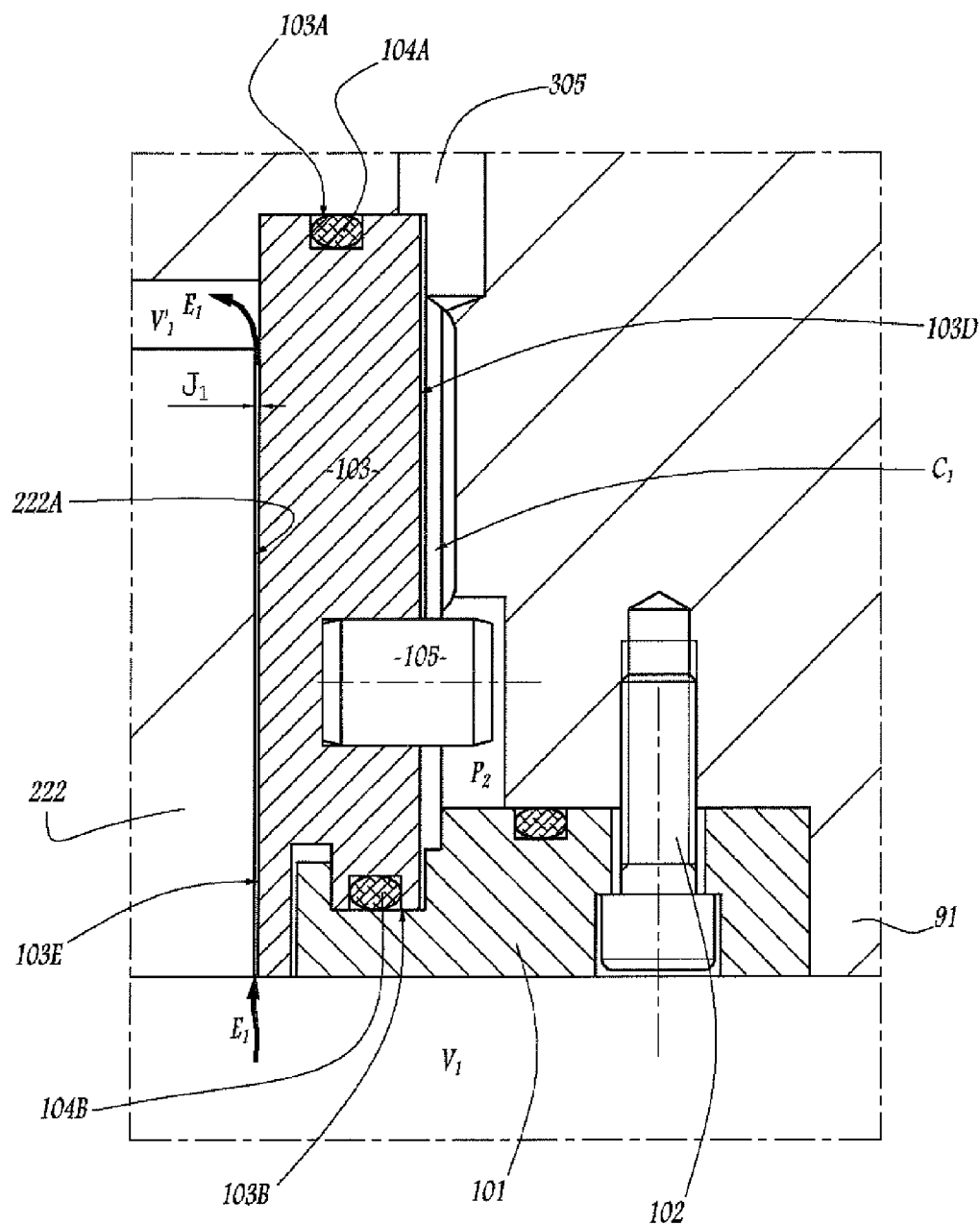
FIG. 8 is a view analogous to FIG. 7 when the machine is in a second operating configuration.

A plurality of studs, only one of which is visible in FIGS. 7 and 8 with the reference 105, make it possible to index the ring 103 relative to the portion 91 in rotation about the axis $X_2$ of rotation of the wheel.

The ring 103 has a radially outside surface 103E disposed facing the radially outside surface 222A of the edge 222, while defining operating clearance J that makes it possible for the wheel 2 to move relative to the stationary portion 81. An unwanted flow $E_1$ flows in the annular space defined by the surfaces 103E and 222A, from a volume $V_1$ in which the forced flow E flows at the inlet of the wheel 2, in the vicinity of the ceiling 22, towards a volume $V'_1$ provided between the ceiling 22 and the portion 91, above the wheel 2.

A chamber $C_1$ of variable volume is defined between the portion 91 and the radially outside surface 103D of the ring 103. This chamber is connected via at least one tap-off 305 to feed means analogous to the feed means mentioned for the first embodiment, and comprise a pipe 301 fed from a tap-off provided on a feed duct of the casing 3 of the installation. This pipe 301 successively feeds a filter 302, a pump 303, and an accumulator tank 308. This accumulator tank 308 is connected via a pipe 309 to an annular duct 304 from which one or more tap-offs 305 extend. A solenoid valve 306 controlled by an electronic control unit 307 controls the flow of secondary water $E_s$ from the accumulator tank 308 to the duct 304. It is thus possible to control the pressure of the water present in the chamber $C_1$.

At transient speeds, the pressure $P_1$ of the water in the chamber $C_1$ has a value that is low or indeed zero, so that, under the effect of its resilience, the ring 103 takes up the position shown in FIG. 7 in which the clearance J has a first value $J_1$ that is relatively large.

At a steady speed, an additional quantity of water is brought into the chamber $C_1$, thereby bringing the pressure in this chamber to a value $P_2$ that is greater than the value $P_1$. The effect of this is to deform the ring 203 radially, towards the axis $X_2$ and towards the surface 222A, the ring then taking up the configuration of FIG. 8, in which the clearance J has a value $J_2$ less than the clearance value of FIG. 7. This makes it possible to limit the through section area of the unwanted flow $E_1$, towards the volume $V'_1$.

An unwanted flow tends to flow between a volume V2 in which the forced flow at the inlet of the wheel 2 flows, in the vicinity of the belt 23, towards a volume $V'_2$ provided around the belt, between said belt and a stationary cylinder 93.

A device 200 is disposed in the vicinity of the upstream edge 232 of the belt 23 in order to limit the flow $E_2$. This device 200 has a housing 201 made up of two portions 201A and 201B fastened to a plate 92 belonging to the stationary structure 9 of the installation I. A deformable ring 203 is mounted in the box 201 and, at its top edge, carries an O-ring seal 204A mounted in a groove 203A. In addition, an O-ring seal 204B is mounted in the bottom portion 201B of the body 201, inside a groove 201K.

Figure 9:
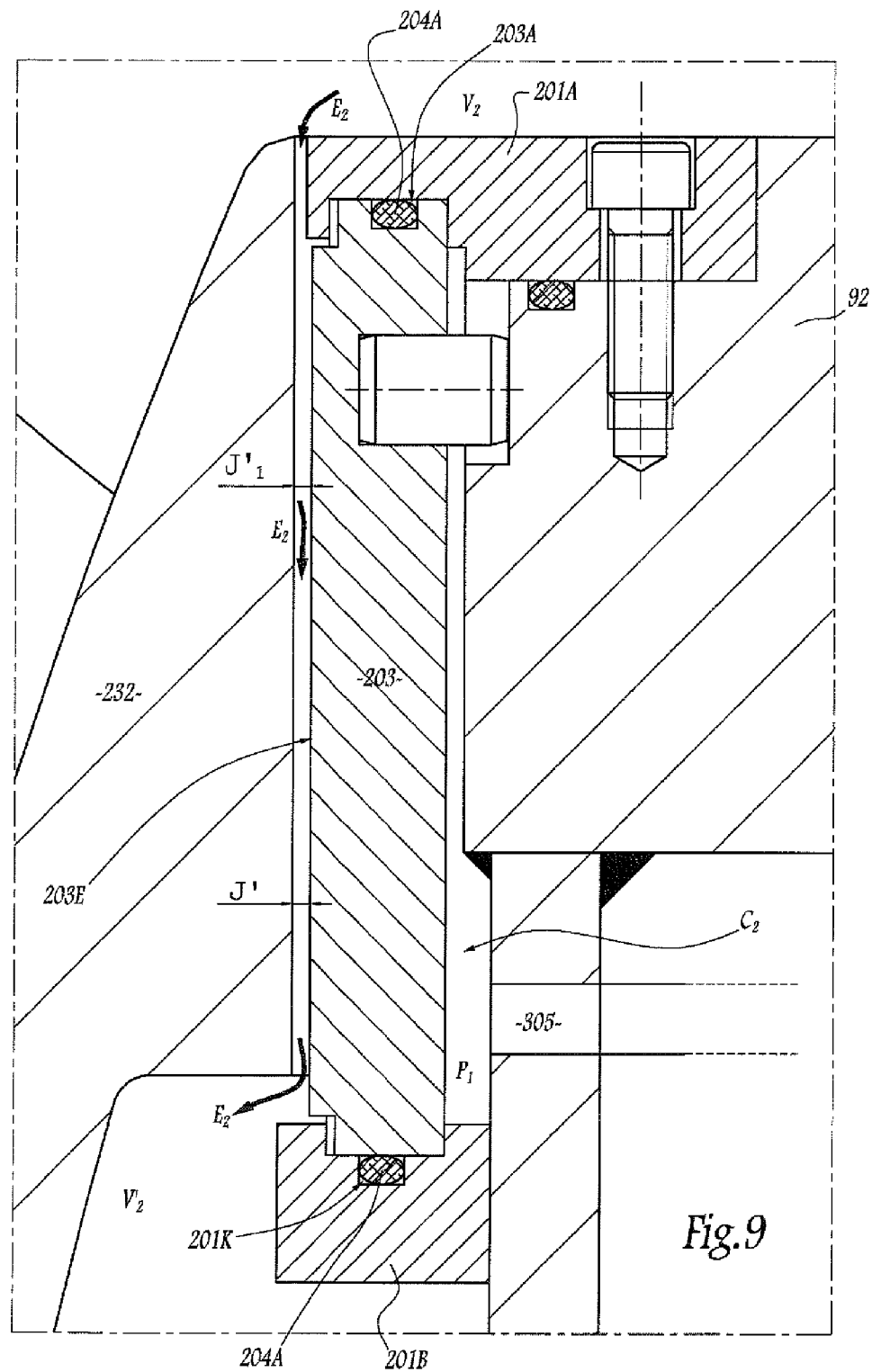
FIG. 9 is a view on a larger scale of the detail IX of FIG. 6.
Figure 10:
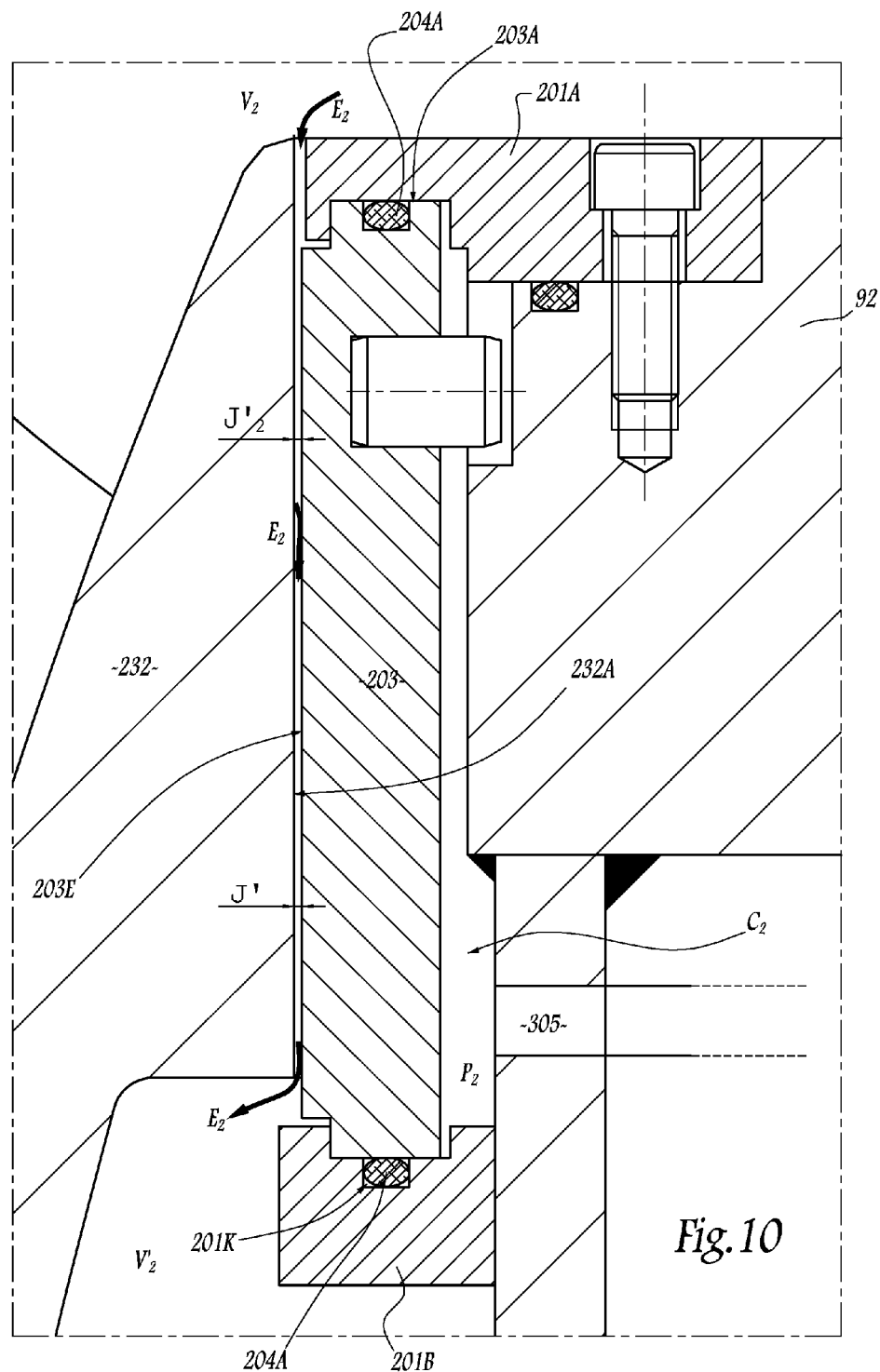
FIG. 10 is a view analogous to FIG. 9 when the machine is in a second operating configuration.

A chamber $C_2$ of variable volume that can be fed with water under pressure through a tap-off 505, such that the ring 203 takes up one or other of the configurations shown respectively in FIGS. 9 and 10, as a function of the value of the pressure, $P_1$ or $P_2$, respectively prevailing in the chamber $C_2$.

The chamber $C_2$ is connected to an annular duct 504 analogous to the duct 304.

Thus, the clearance J' between the radially inside surface 203E of the ring 203 and the radially outside surface 232A of the edge 232 can take one of the values $J'_1$ and $J'_2$ shown respectively in FIGS. 9 and 10. The configuration of FIG. 10, in which the clearance J' is minimal, is selected for the steady operating speeds of the installation I, whereas the configuration of FIG. 9 is preferred for transient speeds and for periods during which speed is changed, in particular start-up periods or periods of excessive speed. The unwanted flow $E_2$ is thus minimized while the installation is operating at a steady speed.

In the third embodiment of the invention shown in fragmentary manner in FIG. 11, elements analogous to the elements of the first embodiment bear identical references.

In the water leak limiter device 100, a plurality of segments 103 are distributed around the outside peripheral edge 222 of the ceiling 22 of a Francis turbine wheel. Each segment 103 is equipped with a top groove 103A and with a bottom groove 103B in which a seal 104A or 104B is disposed.

The segments 103 overlap one another in a radial direction relative to the axis of rotation $X_2$ of the wheel 2. More precisely, each ring 103 has a portion 103M forming a rabbet 103N in which a corresponding portion 103P of an adjacent segment can be engaged. The portions 103M and 103P of two adjacent segments 103 thus overlap each other.

This overlap is achieved by providing a lateral gap $E_L$ between a radially outside surface 103Q of a portion 103M of a segment 103 and a facing surface 103R of an adjacent portion 103S of another segment 103. In the same way, a lateral gap $E'_L$ is provided between two radial surfaces 103T and 103V defined respectively by a portion 103P of a segment 103 and by a facing portion 103X of another segment 103.

The segments 103 are disposed in a housing 101 against which the seals 104A and 104B bear and that has a rear partition 101L that co-operates with the outside radial surfaces 103D of the segments 103 and in a radial direction relative to the axis $X_2$, to define a chamber $C_1$ of variable volume.

As above, it is possible to control the pressure of a quantity of water injected into the chamber $C_1$ via one or more tap-offs 305, in order to control the movement of the segments 103 in radial directions indicated by arrows $F_1$ in FIGS. 11 and 12. This makes it possible to control the value of the radial clearance J between the radially inside surface 103E of the various segments 103 and the radially outside surface 222A of the edge 22.

The lateral gaps $E_L$, $E'_L$ make it possible to move the segments 103 closer together while they are moving towards the axis $X_2$.

Seals 107 are disposed parallel to the axis $X_2$ and provide the sealing between the chamber $C_1$ and the interstice that exists between the surfaces 103T and 103V of the segments 103.

As in the first embodiment, the housing 101 is provided with walls 101C and 101D that limit the movement of the segments 103 towards the axis $X_2$.

In the fourth embodiment of the invention shown in FIG. 13, a plurality of segments 103 are used in a leak limiter device 100, as in the embodiment of FIGS. 11 and 12, these segments partially overlapping one another and being equipped with seals 104A (or equivalent seals) and 107.

This embodiment differs from the preceding embodiment in that the radial positioning of the segments 103 is controlled not by acting on the pressure in the chamber situated radially outside these segments, but rather by using double-acting actuators 400 that can be controlled hydraulically or pneumatically.

In a variant, the actuators used are single-acting actuators, in which case the pressure of the flow between the segments 103 and the edge 222 is used for pushing said segments back towards a spaced-apart configuration in which the clearance J is increased.

Figure 14:
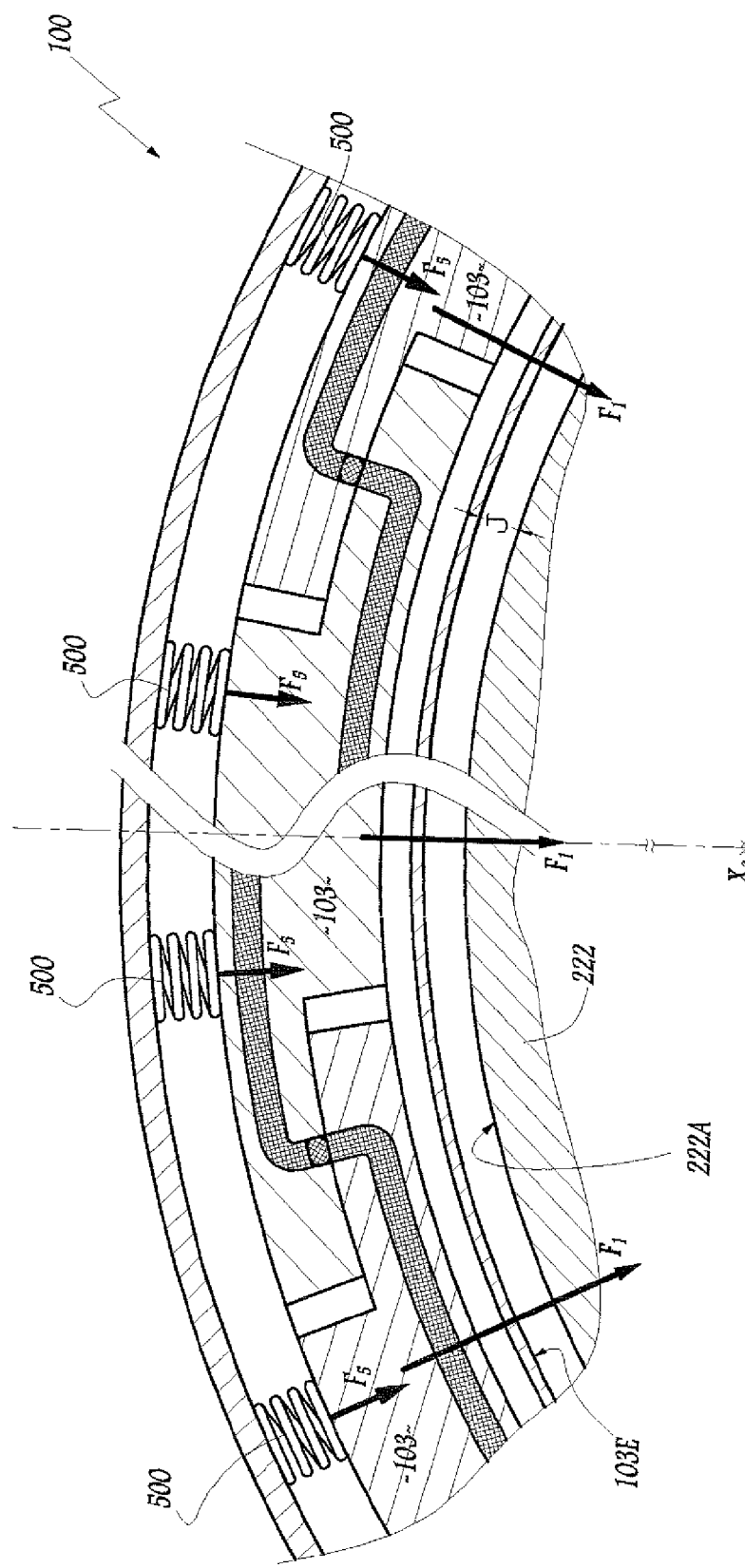
FIG. 14 is a section view analogous to FIG. 11 for a turbine in a fifth embodiment of the invention.

In the embodiment shown in FIG. 14, various segments 103 are used, in a leak limiter device 100. These segments overlap one another as in the embodiment of FIGS. 11 to 13. In this embodiment, springs 500 are distributed around the segments 103 and they make it possible to exert thereon a spring force $F_5$ that is directed towards the axis $X_2$, thereby making it possible to giving a predetermined value to the clearance J between the radially inside surfaces 103E of the segment 103 and the radially outside surface 222A of the edge 222 of the ceiling of a turbine wheel.

In the event of imbalance of the wheel 2, said wheel can hit one of the segments 103 that can then be pushed backed in opposition to the force $F_5$ to which it is subjected, without any significant damage being done to the ceiling of the turbine. This propensity to damp impacts is also present in the machines of the embodiments of FIGS. 1 to 13 because the chambers $C_1$ make it possible for the rings 103 and 203 and the segments 103 to move radially outwards in the event of an impact. These chambers are connected to the accumulator tank 308 (and equivalent reservoirs), thereby making it possible to remove a fraction of the control liquid in the event that a ring or that a segment moves radially outwards under the effect of an impact.

Figure 15:
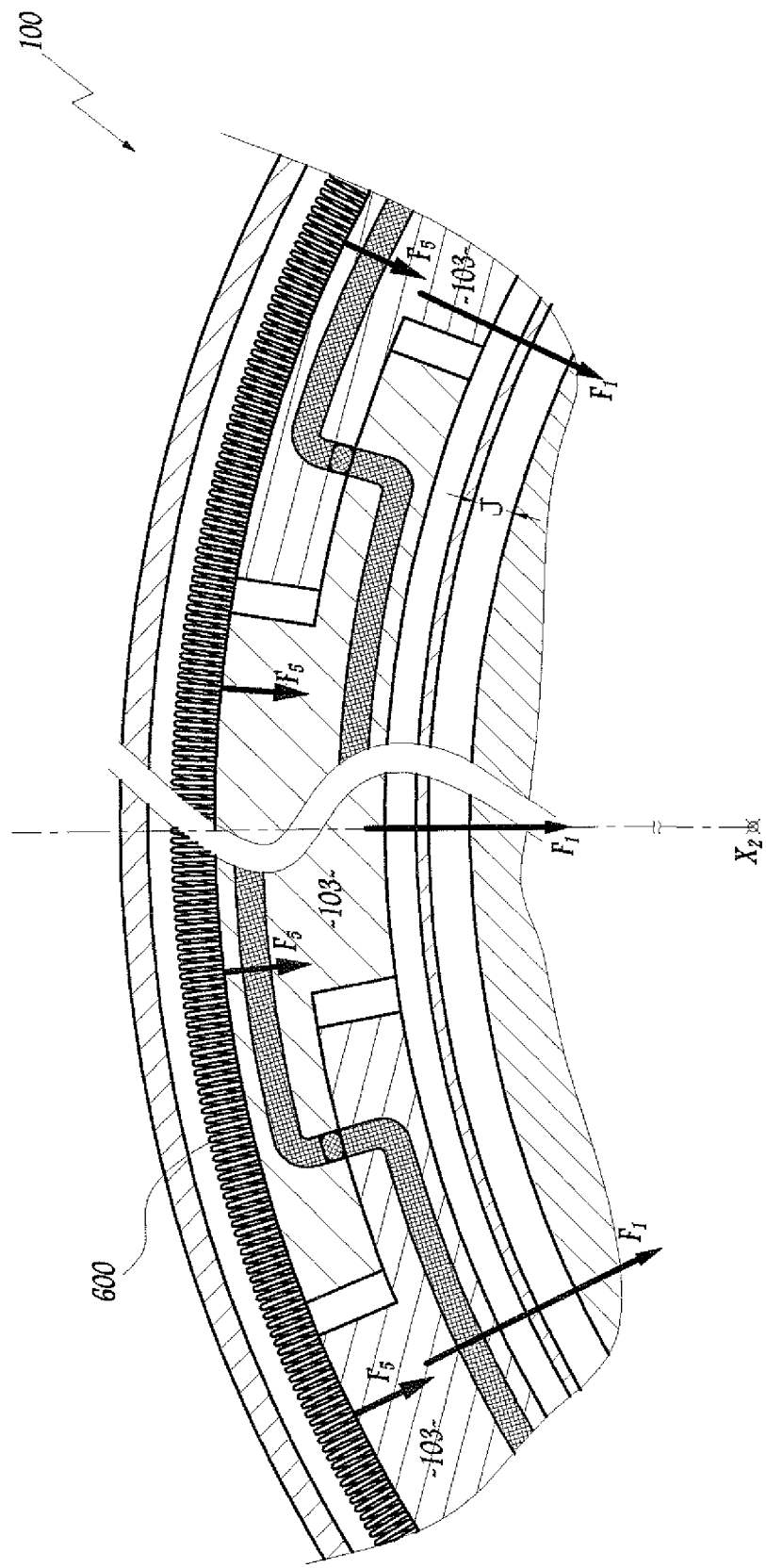
FIG. 15 is a section view analogous to FIG. 11 for a turbine in a sixth embodiment of the invention.

In the variant shown in FIG. 15, the springs 500 may be replaced with a single spring 600 disposed around the segments 103 in a leak limiter device and also exerting a spring force $F_5$ directed towards the axis of rotation $X_2$ of the wheel 2, and distributed over the various segments 103.

In the embodiments of FIGS. 14 and 15, each segment 103 can slide in a radial direction $F_1$ towards the axis $X_2$ and the force $F_5$ tends to urge the segments back into a configuration in which the clearance J is minimal.

The invention is described as implemented in a Francis turbine. However, it is applicable with other types of turbine, with pumps, and with pump turbines. The technical characteristics of the embodiments described and mentioned above may be combined with one another within the ambit of the invention.

The various modes of controlling the positions of the segments 103 that are considered in the third, fourth, fifth, and sixth embodiments may be mutually combined. In particular, springs may be provided in the embodiments of FIGS. 11 to 13.

In the first, second, and third embodiments, a fluid other than water coming from the duct 4 can be used to control the positions of the members 103 or 203. In particular, it is possible to use oil or air under pressure.

The invention claimed is:

1. A hydraulic machine, comprising:
   a wheel mounted to move in rotation relative to a stationary structure and about a stationary axis of rotation, the wheel being designed to pass a forced flow of water there through;
   a plurality of leak limiter devices for limiting water leaks disposed between the wheel and the stationary structure, each leak limiter device defining an operating clearance and between the wheel and the stationary structure, having at least one deformable or movable member that is deformable or movable in a radial direction relative to the axis of rotation, while the wheel is rotating, wherein the deformable or movable member is deformable or mobile in a radial direction between a first configuration corresponding to a first value of an operating clearance and a second value corresponding to a second value of the operating clearance; and
   control means to control movement of the deformable or movable member between its first configuration and the second configuration depending on the operating rotational speed of the wheel,
   wherein a deformable or movable member of at least one of the plurality of leak limiter devices has a stepped surface including adjacent portions of different diameters.

2. The hydraulic machine according to claim 1, wherein each leak limiter device has a deformable member that is deformable under the effect of the pressure exerted by a control fluid, between the first configuration and the second configuration.

3. The hydraulic machine according to claim 2, wherein the deformable member is suitable for deforming by contracting radially to go from the first to the second configuration.

4. The hydraulic machine according to claim 2, wherein each member is mounted on the stationary structure with a radially inside surface facing towards a radially outside surface of the wheel, and in that the operating clearance is defined between the radially inside and outside surfaces.

5. The hydraulic machine according to claim 2, including means for centering the member relative to the axis of rotation of the wheel in each of the first and second configurations.

6. The hydraulic machine according to claim 2, wherein each member co-operates with a portion of the stationary structure to define a chamber of variable volume that varies as a function of the configuration taken up by the members, the chamber being fed with control fluid under pressure.

7. The hydraulic machine according to claim 6, including means for controlling feeding the chamber of variable volume with control fluid under pressure.

8. The hydraulic machine according to claim 2, including means for retaining each member stationary in rotation about the axis of rotation of the wheel.

9. The hydraulic machine according to claim 2 wherein the control fluid is water tapped from a feed duct for feeding the wheel with water for forming the forced flow.

10. The hydraulic machine according to claim 1, wherein at least one of the plurality of leak limiter devices has a plurality of movable members that are mounted to move radially relative to the axis of rotation of the wheel, between the first configuration corresponding to the first value for the operating clearance and the second configuration corresponding to the second value for the operating clearance.

11. The hydraulic machine according to claim 10, wherein each member is mounted on the stationary structure and has a radially inside surface facing towards a radially outside surface of the wheel, and wherein the operating clearance is defined between the radially inside and outside surfaces.

12. The hydraulic machine according to claim 10, including means for centering each member relative to the axis of rotation of the wheel in each of the first and second configurations.

13. The hydraulic machine according to claim 10, wherein each member co-operates with a portion of the stationary structure to define a chamber of variable volume that varies as a function of the configuration of the members, the chamber being fed with control fluid under pressure.

14. The hydraulic machine according to claim 13, including means for controlling feeding the chamber of variable volume with control fluid under pressure.

15. The hydraulic machine according to claim 10, including actuators for controlling movement of the movable members between the two configurations.

16. The hydraulic machine according to claim 10, including at least one resilient means exerting a resilient return force on the movable members for urging the moveable members back into one of the first and second configurations.

17. The hydraulic machine according to claim 10, including means for retaining each member stationary in rotation about the axis of rotation of the wheel.

18. The hydraulic machine according to claim 10, wherein the control fluid is water tapped from a feed duct for feeding the wheel with water for forming the forced flow of water.

19. An installation for converting hydraulic energy into electrical energy, or vice versa, the installation including the machine according to claim 1.

20. A method of adjusting the operating clearance of a leak limiter device that has adjustable clearance and that is part of a hydraulic machine according to claim 1, the method including, while the wheel is rotating about the axis of rotation, adopting a first value for the operating clearance during certain periods of rotation of the wheel, including transient speeds, and a second value for the operating clearance during other periods of rotation of the wheel, including at least one stabilized speed.

21. The method according to claim 20, wherein one of the values for the operating clearance is adopted by controlling the pressure or the quantity of a control fluid delivered to the leak limiter device.

* * * * *